(12) United States Patent
Ikeda et al.

(10) Patent No.: US 7,937,812 B2
(45) Date of Patent: May 10, 2011

(54) BOOT BAND

(75) Inventors: Hiroshi Ikeda, Kanagawa (JP); Yasuo Ogata, Osaka (JP)

(73) Assignee: NHK Spring Co., Ltd. (JP)

( * ) Notice: Subject to any disclaimer, the term of this patent is extended or adjusted under 35 U.S.C. 154(b) by 885 days.

(21) Appl. No.: 11/910,259

(22) PCT Filed: Mar. 31, 2006

(86) PCT No.: PCT/JP2006/306911
§ 371 (c)(1),
(2), (4) Date: Sep. 29, 2007

(87) PCT Pub. No.: WO2006/106952
PCT Pub. Date: Oct. 12, 2006

(65) Prior Publication Data
US 2009/0049655 A1    Feb. 26, 2009

(30) Foreign Application Priority Data
Mar. 31, 2005  (JP) .................. 2005-103010

(51) Int. Cl.
*F16B 2/08*  (2006.01)
*F16L 33/00*  (2006.01)
*B65D 63/02*  (2006.01)

(52) U.S. Cl. ..................... 24/20 R; 24/20 CW

(58) Field of Classification Search ............ None
See application file for complete search history.

(56) References Cited

U.S. PATENT DOCUMENTS

| | | | | |
|---|---|---|---|---|
| 1,040,926 A | * | 10/1912 | Gibbs | 24/20 LS |
| 1,690,643 A | * | 11/1928 | Lavender | 24/20 R |
| RE33,744 E | * | 11/1991 | Oetiker | 24/20 R |
| 5,669,113 A | * | 9/1997 | Fay | 24/20 CW |
| 5,768,751 A | | 6/1998 | Oetiker | |
| 6,088,886 A | * | 7/2000 | Gyongyosi | 24/279 |

(Continued)

FOREIGN PATENT DOCUMENTS
EP    0816739    1/1998
(Continued)

OTHER PUBLICATIONS

U.S. Patent Re. 33,744, reissued Nov. 19, 1991, Hans Oetiker.

*Primary Examiner* — Jack W. Lavinder
(74) *Attorney, Agent, or Firm* — Lowe Hauptman Ham & Berner, LLP

(57) ABSTRACT

The resistance against the portion of a band body that is riding over engagement claws at the time of fastening the band body is reduced, so that the band body can be fastened by a small amount of fastening force. This boot band consists of: a band body that is fastened by winding in a ring shape an outer overlapping portion and an inner overlapped portion around a member to be fastened; engagement claws and that are formed on the outer overlapping portion; engagement holes that are formed in the inner overlapped portion and that engage with the engagement claws, so as to maintain the band body in a fastened condition; a lip that is formed by separating, along the fastening direction of the band body, the area of the inner overlapped portion where an engagement hole is formed from that area's surrounding area, and with the fastening-direction end of the lip formed as a free end; and a slit, which the lip penetrates through to the opposite side of the slit.

5 Claims, 10 Drawing Sheets

U.S. PATENT DOCUMENTS

| | | | |
|---|---|---|---|
| 6,098,251 A * | 8/2000 | Zielinski | 24/20 R |
| 6,598,269 B2 * | 7/2003 | Oetiker et al. | 24/20 CW |
| 2002/0189055 A1 * | 12/2002 | Oetiker et al. | 24/20 CW |
| 2007/0186387 A1 * | 8/2007 | Ogino et al. | 24/20 R |
| 2009/0151133 A1 * | 6/2009 | Zhang | 24/20 R |
| 2009/0172924 A1 * | 7/2009 | Ito et al. | 24/20 CW |

FOREIGN PATENT DOCUMENTS

| | | |
|---|---|---|
| JP | 10068475 | 3/1998 |
| JP | 3001266 | 11/1999 |
| JP | 200097212 | 4/2000 |

* cited by examiner (a)

(b)

(a)

(b)

(c)

(a)

(b)

BOOT BAND

CROSS-REFERENCE TO RELATED APPLICATIONS

The present Application is based on International Application No. PCT/JP2006/306911, filed Mar. 31, 2006 which in turn corresponds to Japan Application No. 2005-103010, filed on Mar. 31, 2005 and priority is hereby claimed under 35 USC §119 based on these applications. Each of these applications are hereby incorporated by reference in their entirety into the present application.

FIELD OF THE INVENTION

The present invention relates to a boot band, which fastens a tube-like or boot-like fastened member made of rubber, resin, or the like, onto another member.

BACKGROUND OF THE INVENTION

A boot band is used, for example, to fasten a boot that covers the transmission of an automobile so as to prevent inside grease from flowing out of the transmission and past the boot, and to prevent water and foreign matter from proceeding past the boot and going into the transmission. Also, a boot band can be wound around a member to fasten the member, and therefore a pair of tool claws are provided on the boot band so as to enable fastening by use of a fastening tool.

FIGS. 9 and 10 show a first conventional boot band 1 described in U.S. Pat. No. Re. 33744, and FIGS. 11 and 12 show a second conventional boot band 2 described in Japanese Patent No. 3001266. Each of the boot bands 1 and 2 includes a band body 3 made of sheet metal, and each is wound like a ring around a fastened member in such a way that the fastened member is inserted into the boot band, so as to be fastened. The band body 3 is wound around the member to be fastened so that the band body 3 has an outer overlapping portion 4 and an inner overlapped portion 5.

In the first conventional boot band 1, a first tool claw 6 is formed on the outer overlapping portion 4, and a second tool claw 7, which is paired with the first tool claw, is formed on the inner overlapped portion 5. Engagement holes 8 and 9 are formed in the outer overlapping portion 4 in area of the outer overlapping portion 4 that is closer to the end of the boot band 1 than it is to the first tool claw 6. The engagement hole 8 is longer than the engagement hole 9, and is also used as a tacking hole for tacking the band body 3. A tacking hook 10, and engagement claws 11 and 12 are arranged sequentially—from the second tool claw 7—on the inner overlapped portion 5 of the boot band 1 in the longitudinal direction of the band body 3.

As shown in FIG. 10, the boot band 1 is wound like a ring, and then the second tool claw 7 and the tacking hook 10 are inserted in the engagement hole 8 of the outer overlapping portion 4. Thereafter, a fastening tool (a fastening tool 15 is shown in FIG. 12) is hooked onto the pair of tool claws 6 and 7, and the tool claws 6 and 7 are fastened so as to reduce the distance between the tool claws 6 and 7, so that the diameter of the ring-like band body is reduced. The Arrows F in FIG. 10 show the directions in which the tool claws 6 and 7 are moved as a result of the fastening. As a result of this fastening, the engagement claw 11 enters into and is engaged with the engagement hole 8, and the engagement claw 12 enters into and is engaged with the engagement hole 9, so that fastening of the boot band is achieved while its reduced diameter is maintained.

At this time, the outer end of the outer overlapping portion 4 (the portion where the engagement hole 9 is located) is not in contact with the inner overlapped portion 5, and therefore, the end of the outer overlapping portion 4 is pressed—from the outer periphery side—toward the center of the ring (in the direction shown by the arrow G in FIG. 10). While this pressing is maintained, the engagement claw 12 is engaged with the engagement hole 9 for final fastening.

In a second conventional boot band 2, as shown in FIGS. 11 and 12, a first tool claw 21 is formed atop the outer end side of the outer overlapping portion 4, and a second tool claw 22, which is paired with the first tool claw 21, is formed on the inner overlapped portion 5. Also, engagement holes 23, 24, and 25 are formed—sequentially and in the longitudinal direction of the band body 3 from the first tool claw 21 side—in the outer overlapping portion 4, and engagement claws 26, 27, and 28, which correspond to the engagement holes 23, 24 and 25, are formed on the inner overlapped portion 5.

The second tool claw 22 is press-molded to project outward in the radial direction, and therefore an opening 22a, which is opened toward the first tool claw 21, is formed in the second tool claw 22. Meanwhile, a flat terminal 29 that extends toward the end of the outer overlapping portion 4 is formed on the outer overlapping portion 4 and at a place that is closer to the end of the outer overlapping portion 4 than is the first tool claw 21. This terminal 29 enters into the second tool claw 22 through the opening 22a.

As shown in FIG. 12, to fasten the second conventional boot band 2, the band body 3 is made into a ring-like form and is wrapped around a member (not shown in FIG. 12) to be fastened. Under this condition, a pair of claw parts 15a and 15b of a fastening tool 15 are pressed in the longitudinal direction against, and locked with, the tool claws 21 and 22, respectively, and the tool claws 21 and 22 are respectively pressed in the directions shown by the arrows F, so as to reduce the distance between the tool claws 21 and 22 so as to reduce the distance between the tool claws 21 and 22, so that the diameter of the ring-like band body is reduced. In this fastening, the terminal 29 moves in the direction shown by the left-side arrow F and enters into the opening 22a while the engagement claws 26, 27, and 28 become engaged with the engagement holes 23, 24, and 25, respectively, resulting in a fastened condition.

Patent Document 1: U.S. Pat. No. Re. 33744.
Patent Document 2: U.S. Pat. No. 3,001,266.

DISCLOSURE OF THE INVENTION

Problem to be Solved by the Invention

In the first conventional boot band 1, shown in FIGS. 9 and 10, it is necessary that pressure be applied to the band body 3 in the diameter-reducing direction by using a fastening tool, that the outer overlapping portion 4 is pressed toward the longitudinal center of the boot band while this pressure is maintained, and that the boot band be fastened while maintaining the pressed condition. Therefore, to fasten the boot band, two operations—one in the diameter-reducing direction and one in the boot band's longitudinal direction—are necessary, resulting in a troublesome fastening operation. Also, because two operations are necessary, the time needed for fastening is long, which results in the problem of slow workability.

In contrast, the second conventional boot band 2, shown in FIGS. 11 and 12, does not require an operation to press the outer overlapping portion 4 in the longitudinal direction, because a first tool claw 21 is arranged near both the terminal 29 and the second tool claw 22. Thus, only one action—fastening the tool claws 21 and 22—is necessary to fasten the boot band, and therefore it can be fastened more easily and more quickly than can the first conventional boot band 1.

However, when the outer overlapping portion 4 of the boot band 2 rides over the engagement claw 26 of the inner overlapped portion 5, the outer overlapping portion 4 can become hooked with the peak of the engagement claw 26 and become locked. As shown in FIG. 13, this locking can cause buckling 19 of the inner overlapped portion 5 of the boot band, between the second tool claw 22 and the engagement claw 26. When such buckling 19 occurs, fastening becomes unstable.

Also, when this boot band 2 is fastened, fastening pressure is applied to the pair of tool claws 21 and 22, and then the outer overlapping portion 4 and inner overlapped portion 5 slide in opposite directions so as to shorten the circumference of the boot band 2. At the time of this sliding, the outer overlapping portion 4 rides over the engagement claw 26 of the inner overlapped portion 5, and therefore, the pressure at the time of riding over the engagement claw 26 needs to be large. Therefore, a large fastening force is necessary, which adversely affects the ease of fastening.

The present invention has been made in light of the above-mentioned problems, and one objective of this invention is to provide a boot band that can reduce resistance at the time of riding over an engagement claw, that can be fastened by a small fastening force, and that can prevent the aforementioned buckling.

Means for Solving the Problems

To achieve the above-mentioned objective, a boot band according to claim 1 is characterized in that the boot band consists of:
a band body that is fastened, by being wound in a ring shape around a member to be fastened, under the condition that said band body has an outer overlapping portion and an inner overlapped portion that form the ring-like shape by being overlapped on each other;
engagement claws that are formed on said outer overlapping portion of the band body engagement holes that are formed in said inner overlapped portion of the band body and that become engaged with said engagement claws so as to maintain the band body in a fastened condition;
a lip that is formed by separating—in said fastening direction—said inner overlapped portion's area in which an engagement hole is formed, from the band body's area surrounding that area, and whose end in said fastening direction is formed as a free end; and a slit that is formed near said engagement claws in said outer overlapping portion so that said lip penetrates through to the opposite side of the slit.

According to the invention described in Claim 1, the lip, which is formed in the engagement-hole-forming area of the inner overlapped portion, penetrates through the slit of the outer overlapping portion and goes outside the outer overlapping portion. As a result, the resistance at the time of riding over the engagement claw of the outer overlapping portion is low. Thus, the boot band can be fastened by a simple operation and a small fastening force. Also, the load on the band body is not larger than necessary, and therefore the band body does not buckle.

The invention described in Claim 2 is a boot band according to Claim 1, characterized in that an elastic force is applied to said lip in the direction for engaging said engagement holes with said engagement claws.

According to the invention described in Claim 2, due to the elastic force given to the lip, the engagement holes become engaged with the engagement claws simultaneously with the fastening. Therefore, an additional operation for engaging is not necessary, and thus the boot band can be fastened by only one action, and the fastening operation can be done quickly.

The invention described in Claim 3 is a boot band according to Claim 1, characterized in that a guide slit that extends in said fastening direction is formed in either said outer overlapping portion or said inner overlapped portion, and
a guide projection that slidably penetrates said guide slit is formed in either said inner overlapped portion or said outer overlapping portion—whichever is the reverse portion of the aforementioned portion in which the guide slit is formed.

According to the invention described in Claim 3, the guide projection penetrates through the guide slit. Therefore, at the time of fastening, the outer overlapping portion and the inner overlapped portion do not become misaligned from each other in the width direction. Thus, fastening of the band body can be done smoothly.

The invention described in Claim 4 is a boot band according to Claim 1, characterized in that an area where a slit is formed has a stronger structure than the area surrounding the area where the slit is formed.

According to the invention described in Claim 4, because the slit-forming area has a stronger structure, that area more strongly resists being broken, and therefore breaking and the like of the boot band is prevented at the time of fastening.

The invention described in Claim 5 is a boot band according to Claim 4, characterized in that ribs are formed in the area around said slit so as increase the strength of that area.

In the invention described in Claim 5, the stronger structure is obtained only by forming the ribs. Thus, the strength can easily be made large.

ADVANTAGEOUS EFFECTS OF THE INVENTION

According to the present invention, the lip of the inner overlapped portion penetrates through the slit of the outer overlapping portion, and goes outside the outer overlapping portion. Thus, the resistance at the time of riding over the engagement claws of the outer overlapping portion is low, and the band body can be fastened by a small fastening force, so that the boot band can easily be fastened. Also, the engagement claws of the outer overlapping portion do not become hooked with the lip of the inner overlapped portion, and thus buckling is prevented.

Figure 1:
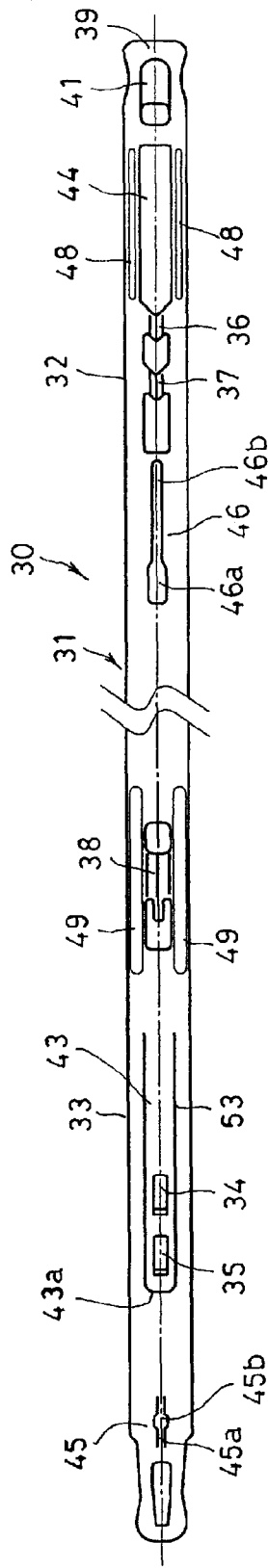
FIGS. 1(*a*) and 1(*b*) are a plane view and a side view, respectively, showing the first embodiment of the boot band.
Figure 1:
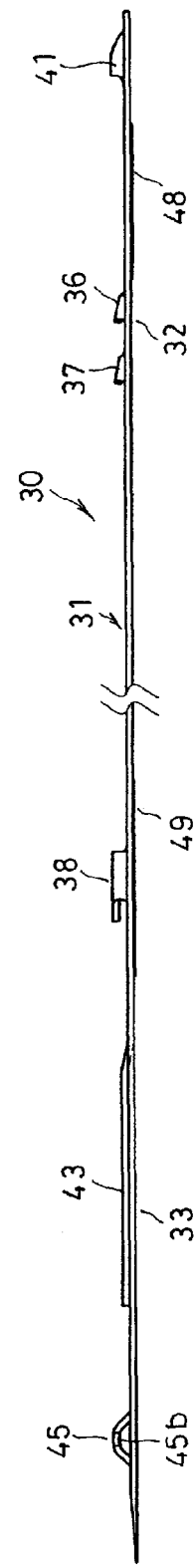

EXPLANATION OF NUMBERS 30, 60, 70 boot bands
31 band body
32 outer overlapping portion
33 inner overlapped portion
34, 35 engagement holes
36, 37 engagement claws
38 second tool claw
41 first tool claw
43 lip
44 slit
45 guide projection
46 guide slit
48 rib

BEST MODES FOR CARRYING OUT THE INVENTION

The present invention will now be explained in detail in connection with the illustrated embodiments. Also, in the respective embodiments, identical members have identical reference numbers.

First Embodiment

Figure 2:
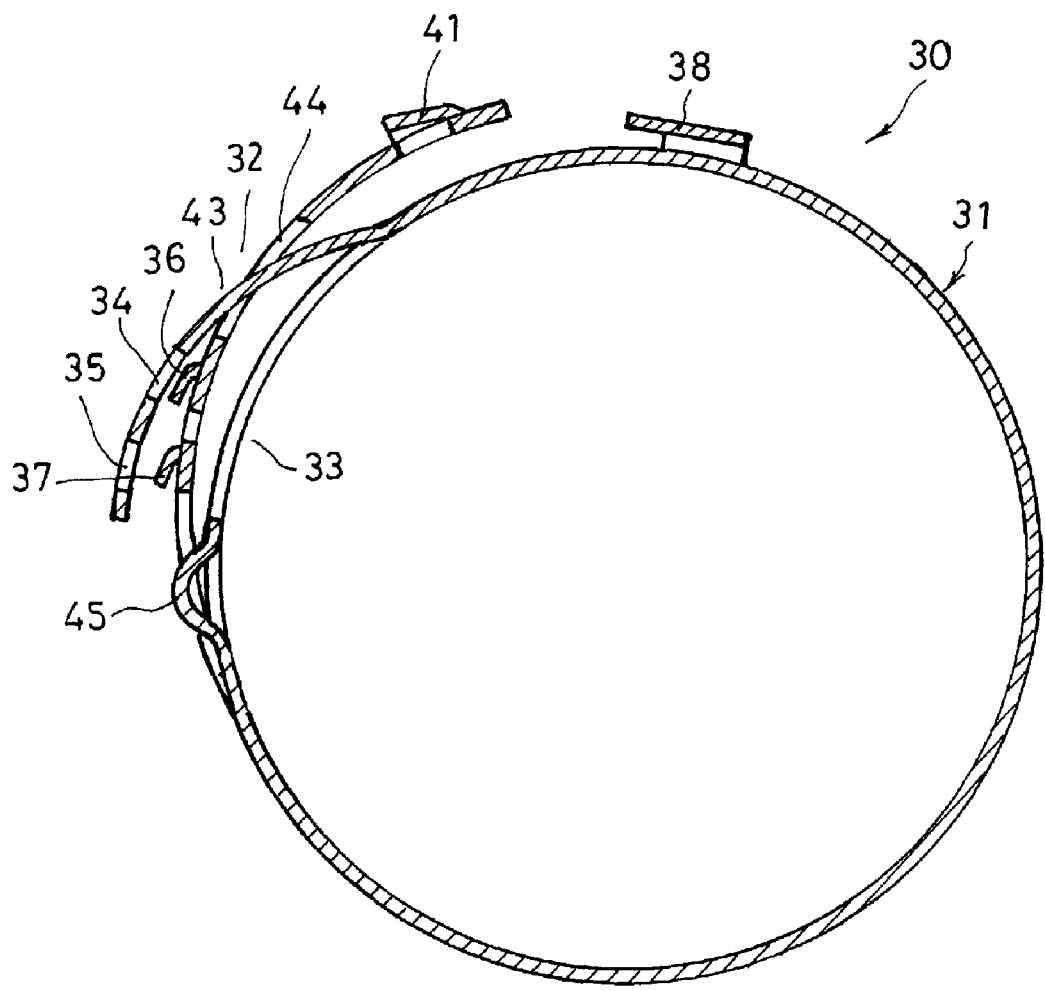
FIG. 2 is a longitudinal cross-sectional view showing the first embodiment of the boot band just before the boot band is fastened.
Figure 3:
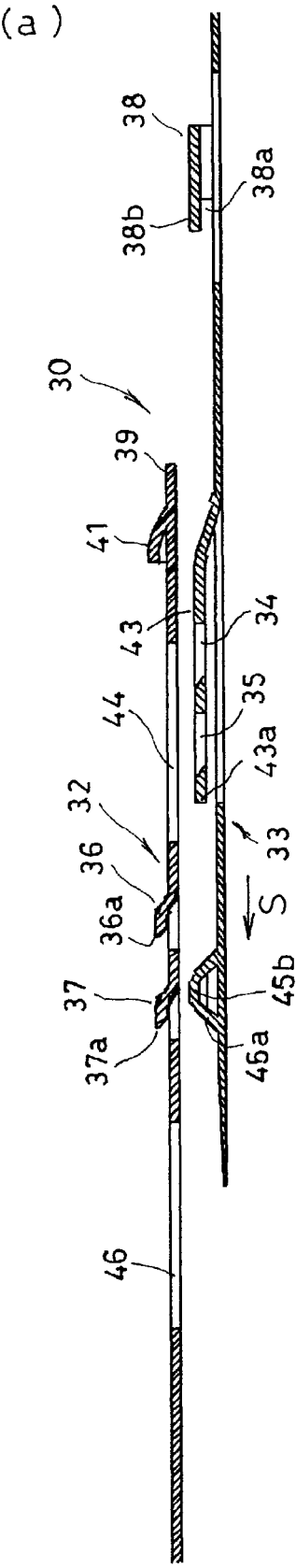
FIGS. 3(*a*) to 3(*c*) are longitudinal cross-sectional views showing different phases of the fastening process of the first embodiment.
Figure 3:
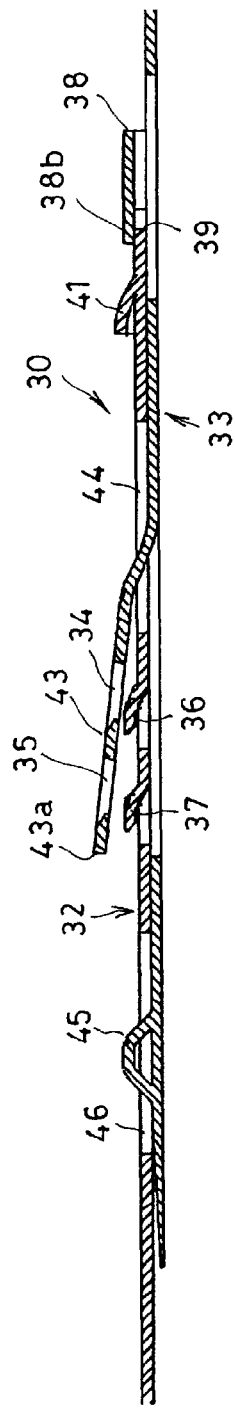
Figure 3:
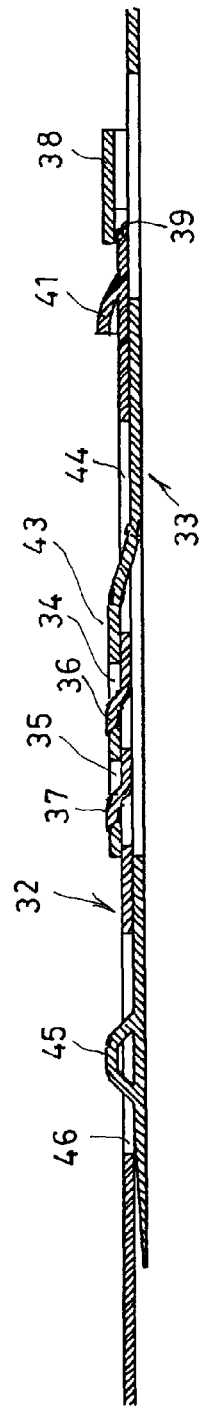
Figure 4:
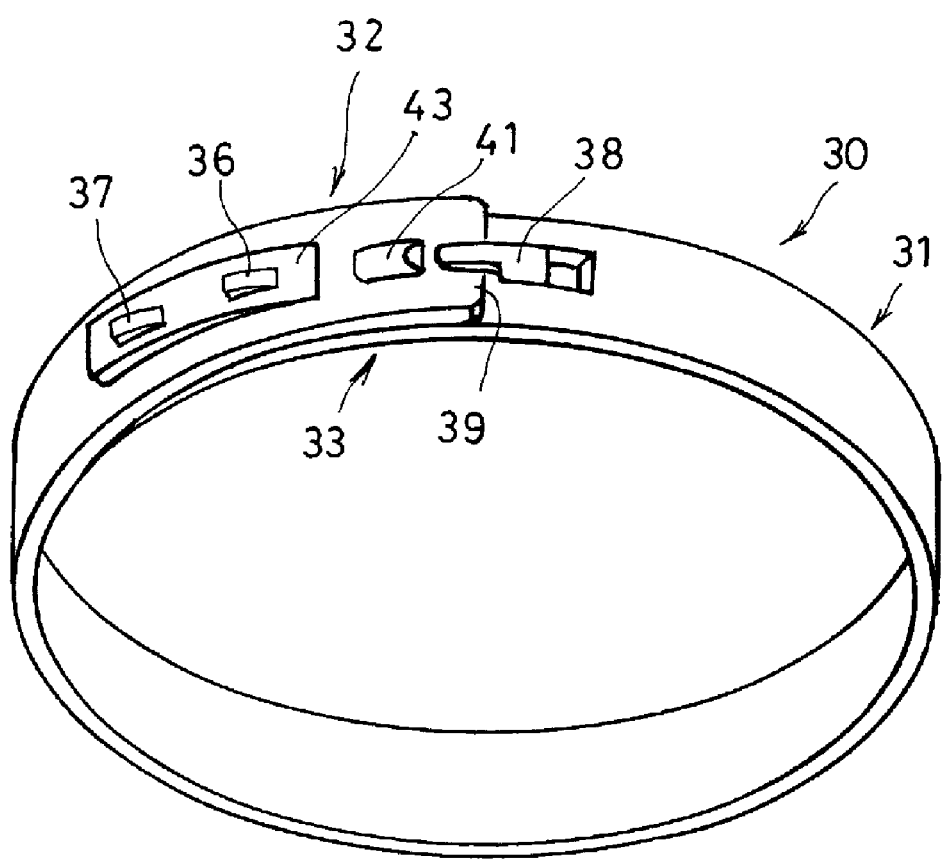
FIG. 4 is a perspective view showing the first embodiment when fastened.

FIGS. 1 to 4 show a boot band 30 in a first embodiment of the present invention. FIGS. 1(a) and 1(b) are, respectively, a front view and a side view thereof; FIG. 2 is a longitudinal cross-sectional view just before the boot band is fastened; FIGS. 3(a), 3(b), and 3(c) are longitudinal cross-sectional views showing phases of the fastening process; and FIG. 4 is a perspective view showing the first embodiment of the boot band when fastened.

A shown in FIG. 1(a), the boot band 30 is formed of a belt-like band body 31. The band body 31 is formed into a belt-like shape by press-punching and slit-processing a metal sheet. The belt-like shape of the band body 31 is utilized to wind the band body 31 like a ring around a member (not shown) to be fastened. It is preferable that the metal material of the band body 31 be a spring material; by using a spring material, the boot band 30 can have high tensile strength. As shown in FIGS. 2 and 3, the band body 31 is wound like a ring so as to form an outer overlapping portion 32 and an inner overlapped portion 33. By making the outer overlapping portion 32 and the inner overlapped portion 33 approach each other so as to reduce the diameter of the band body 31, the band body 31 fastens the member to be fastened.

A first tool claw 41 that rises outward in the radial direction is formed toward the end of the outer overlapping portion 32 of the band body 31. Also, a terminal 39 extends in the longitudinal direction at the end of the outer overlapping portion 32, beyond the first tool claw 41. The terminal 39 is formed so as to be opposed to a second tool claw 38, described below, that is on the inner overlapped portion 3. The terminal 39 is formed flat, so that it can be smoothly inserted into the opening 38a of the second tool claw 38 3.

Engagement claws 36 and 37 are sequentially formed on the outer overlapping portion 32 in the longitudinal direction. The engagement claws 36 and 37 are located at almost the widthwise center of the outer overlapping portion 32 and closer to the longitudinal center of the band body 31 than where the first tool claw 41 is located. The engagement claws 36 and 37 are formed so as to diagonally rise in the radial direction from the outer overlapping portion 32, and so as to enter into and become engaged with below-described engagement holes 34 and 35, respectively, of the inner overlapped portion 33. By this engagement, the fastened condition of the band body 31 is maintained.

The engagement holes 34 and 35 corresponding to the engagement claws 36 and 37 are sequentially formed in the longitudinal direction on the inner overlapped portion 33 of the band body 31. The second tool claw 38, which is paired with the first tool claw 41, is formed nearer to the engagement claws 36 and 37 than are the engagement holes 34 and 35.

The second tool claw 38 is formed on the inner overlapped portion 33 and is formed so as to extend above the inner overlapped portion 33. As shown in FIG. 3, the second tool claw 38 has an opening 38a at its lower part and a retainer 38b on its upper part. The opening 38a is opened on the first tool claw 33 side when the band body 31 is being wound, and therefore the above-mentioned terminal 39 can be inserted into the opening 38a. The retainer 38b extends nearer to the first tool claw 33 than the opening 38a does, and it acts so as to press the terminal 39, which is inserted into the opening 38a, from the outside.

In addition, a lip 43 and a slit 44 are formed in the band body 31.

The lip 43 is formed by separating an area of a predetermined length (an engagement-hole-forming area), including the engagement holes 34 and 35, of the inner overlapped portion 33 from the surrounding area by a line slit 53. The engagement-hole-forming area is positioned inward in the width direction of the inner overlapped portion 33, and both sides of the engagement hole area in the width direction of the band body 31 are integrally formed as part of the band body 31, so that the line slit 53 forms the part that, when separated—by the line slit 53—from the surrounding area on both sides in the width direction, constitutes the lip 43.

Also, the lip 43 is formed so that its end in the fastening direction for reducing the diameter of the band body 31 is a free end 43a that is separated from the surrounding area along the longitudinal direction of the band body 31. Meanwhile, the end opposite to the free end 43a is integrated with the inner overlapped portion 33. Here, the fastening direction of the band body 31 is the direction for reducing the diameter of the band body 31, which is the direction for making the outer overlapping portion 32 and the inner overlapped portion 33 approach each other in the longitudinal direction of the band body 31. In this embodiment, the direction shown by the arrow S in FIG. 3(a) is the direction for fastening the band body 31 in relation to the inner overlapped portion 33, and the free end 43a is formed on the end in the direction shown by the arrow S.

The above-mentioned engagement holes 34 and 35 are arranged in the lip 43, which is separated from the surrounding area of the inner overlapped portion 33 by the line slit 53. Here, the lip 43 can rise toward the outer overlapping portion 32 as shown in FIGS. 1 and 3. This rising is restrained to nearly the thickness of the band body 31, and therefore the lip 43 easily enters a slit 44, described below, when the band body 31 is fastened, which results in improved engaging, which contributes to the advantages of the present invention.

The slit 44 is formed so as to penetrate—in the thickness direction—the outer overlapping portion 32 near the engagement claws 36 and 37. In this embodiment, the slit 44 is formed between the engagement claws 36, 37 and the first tool claw 41, and is located nearer to the engagement claws 36 and 37. The slit 44 is formed at almost the center of the band body 31 in the thickness direction, having a width such that the lip 43 can enter the slit 44. The slit 44 has a predetermined length such that the entering lip 43 can move in the fastening direction of the band body 31. Thus, when the band body 31 is being fastened, the lip 43 acts so as to penetrate through the slit 44 in the thickness direction and then to come out the opposite side of the slit 44. The width dimensions of the lip 43 and the slit 44 are set so that the lip 43 moves in the slit 44 while an appropriate gap is maintained between the lip 43 and the sides of the slit 44. Because the width dimensions of the lip 43 and the slit 44 are set in this manner, the slit 44 guides the movement of the lip 43, which prevents the outer overlapping portion 32 and the inner overlapped portion 33 from being misaligned from each other in the thickness direction.

The lip 43 is given an elastic force in the direction for the engagement holes 34 and 35 of the inner overlapped portion 33 to engage with the engagement claws 36 and 37 of the outer overlapping portion 32. As a result, when the band body 31 is fastened, the engagement holes 34 and 35 are automatically engaged with the engagement claws 36 and 37, respectively. The elastic force in such a direction is given by giving to the lip 43 an elastic force toward the center of the band body 31, which is wound like a ring—. For example, the elastic force can be given by curving the lip 43 such that the curvature of the lip 43 becomes smaller than the curvatures of other portions of the band body 31, or by bending the lip 43 to give the above-mentioned force toward the center of the band body 31.

In this embodiment as shown in FIG. 3, rising tips 36a and 37a of the engagement claws 36 and 37, respectively, of the outer overlapping portion 32 rise diagonally toward the rear side of the lip 43. That is to say, the engagement claws 36 and 37 rise in the direction for the rising tips 36a and 37a to be away from the lip 43. When the lip 43 rides over the engagement claws 36 and 37, the rising tips 36a and 37a do not become hooked with the lip 43.

In this embodiment, a guide projection 45 and a guide slit 46 are formed on the band body 31 such that they become engaged with each other. The guide projection 45 is formed toward the end of the inner overlapped portion 33 so as to project toward the outer overlapping portion 32. The guide projection 45 has a rising portion 45a that rises from the inner overlapped portion 33, and has a detachment-prevention portion 45b that is formed to be rather wide at the peak of the rising portion 45a.

Meanwhile, the guide slit 46 is formed closer to the longitudinal center of the outer overlapping portion 32 than are the engagement claws 36 and 37. The guide slit 46 has a wide slit portion 46a, which the detachment-prevention portion 45b of the guide projection 45 penetrates and comes out from, and a narrow slit portion 46b that extends from the wide slit portion 46a in the longitudinal direction of the band body 31.

In this structure, when the band body 31 is wound like a ring, the detachment-prevention portion 45b of the guide projection 45 enters the wide slit portion 46a of the guide slit 46, and comes out the opposite side of the guide slit 46. Thereby, the rising portion 45a is engaged with the guide slit 46. When the band body 31 is fastened in the diameter-reducing direction, the outer overlapping portion 32 and the inner overlapped portion 33 do not become misaligned from each other in the width direction, and the engagement claws 36 and 37 can surely be engaged with the engagement holes 34 and 35, respectively.

Figure 12:
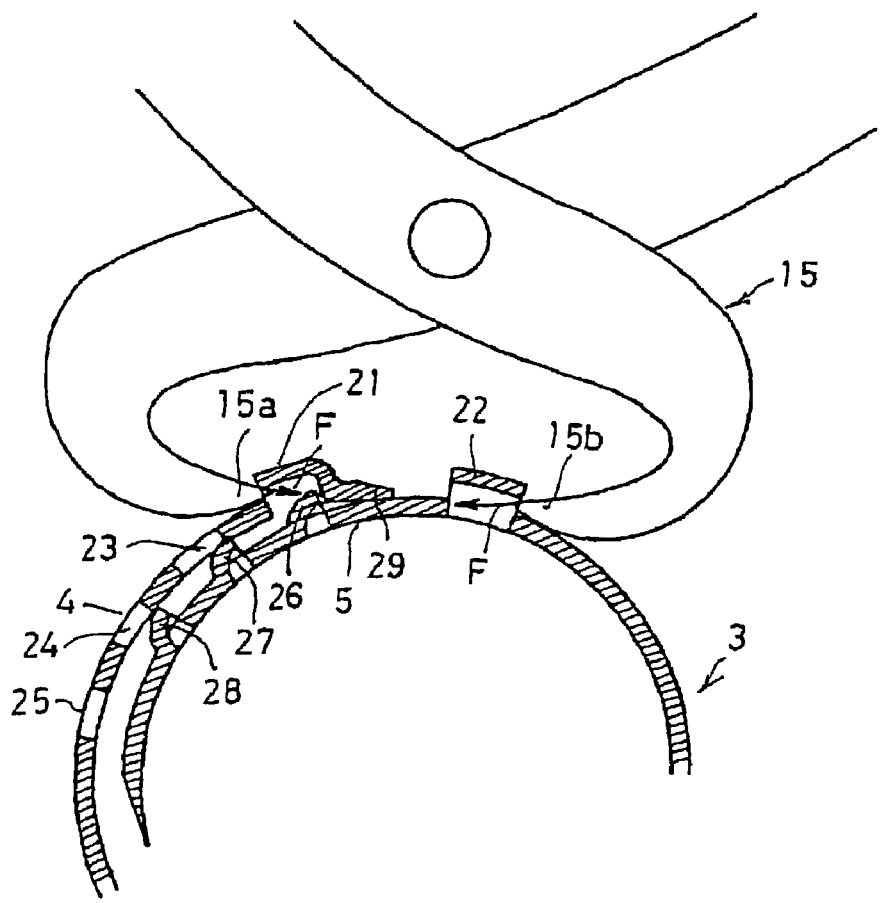
FIG. 12 is a longitudinal cross-sectional view showing the action for fastening the second conventional boot band.
Figure 13:
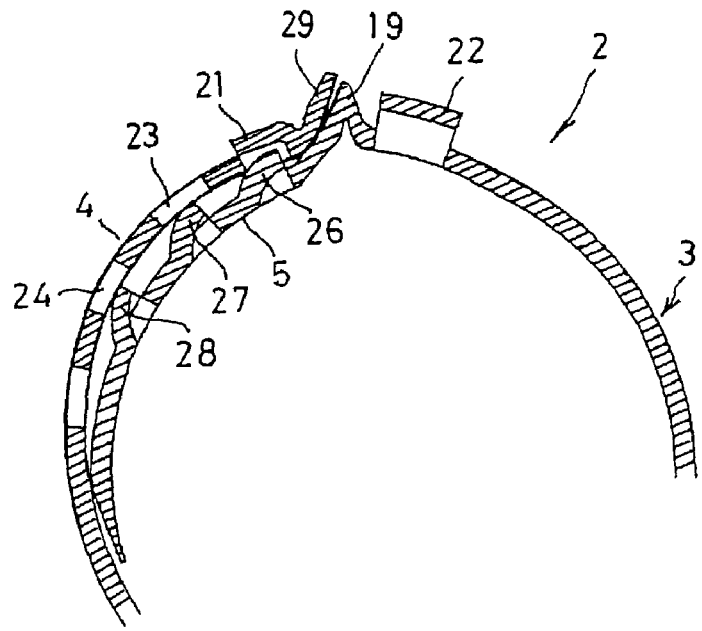
FIG. 13 is a longitudinal cross-sectional view illustrating buckling of the second conventional boot band.

The actions for fastening the boot band 30 in this embodiment will now be explained with reference to FIGS. 2 and 3. As shown in FIG. 2, the band body 31 is wound like a ring so that the outer overlapping portion 32 overlaps the inner overlapped portion 33 on the outside of the fastened member. As a result, the lip 43 is initially situated under the slit 44, as shown in FIG. 3(a). Under this condition, a fastening tool (see the fastening tool 15 in FIG. 12) is hooked with the first tool claw 41 and the second tool claw 38, and the outer overlapping portion 32 and the inner overlapped portion 33 are fastened in the diameter-reducing direction.

Due to this fastening in the diameter-reducing direction, the lip 43 penetrates the slit 44 of the outer overlapping portion 32 and comes out from the opposite side of the slit 44, as shown in FIG. 3(b). Also, due to the fastening in the diameter-reducing direction, the outer overlapping portion 32 slides on the inner overlapped portion 33. By this sliding, the terminal 39 on the tip side of the first tool claw 41 enters into the opening 38a of the second tool claw 38, and then the retainer 38b prevents the first tool claw 41 from being detached from the opening 38a. At almost the same time, the guide projection 45 enters into the guide slit 46, is engaged with the guide slit 46, and is then prevented from being detached from the guide slit 46. In this manner, the outer overlapping portion 32 and the inner overlapped portion 33 approach each other, and therefore the free end 43a of the lip 43 moves in the longitudinal direction of the band body 31 toward the engagement claws 36 and 37 on the longitudinal-center side of the slit 44 while the lip 43 approaches the engagement claws 36 and 37 of the outer overlapping portion 32. Together with this movement, the entire lip 43 moves so as to ride over the engagement claws 36 and 37.

The lip 43 smoothly rides over the engagement claws 36 and 37 of the outer overlapping portion 32, and therefore the resistance at the time of such riding is low. In addition, as described above, the rising tips 36a and 37a of the engagement claws 36 and 37, respectively, rise so as to move away from the lip 43. Therefore, the rising tips 36a and 37a do not become hooked with the lip 43 when riding over the engagement claws 36 and 37. As a result, the lip 43 receives only small resistance when riding over the engagement claws 36 and 37.

FIG. 3(c) shows the final stage of fastening the band body 31 in the diameter-reducing direction. The lip 43, which has ridden over the engagement claws 36 and 37, has an elastic force in the direction for engaging the engagement holes 34 and 35 with the engagement claws 36 and 37, respectively. Therefore, the engagement holes 34 and 35 are engaged with the engagement claws 36 and 37, respectively, in connection with the fastening action. Because of this engagement, the lip 43 comes in close contact with the outside of the outer overlapping portion 32, and therefore the lip 43 does not project outward in the radial direction or become bulky. FIG. 4 is a perspective view showing the first embodiment of the boot band when fastened.

In this manner, when the engagement holes 34 and 35 are engaged with the engagement claws 36 and 37, respectively, in connection with fastening of the band body 31, the fastening operation can be done quickly, and a user is able to easily perceive that fastening has been completed. Because the engagement holes 34 and 35 are engaged with the engagement claws 36 and 37, respectively, in connection with fastening, an additional operation for achieving such engagement is not necessary. Therefore, the band body can easily be fastened by one action only.

In this embodiment, when the band body 31 is fastened in the diameter-reducing direction, the resistance against the lip 43 riding over the engagement claws 36 and 37 is low. As a result, the band body can be fastened by a small amount of fastening force, resulting in easy fastening. In addition, when the band body is being fastened, the load on the band body 31 is not larger than necessary, and therefore the band body 31 does not buckle. Furthermore, in this embodiment, the engagement claws 36 and 37 of the outer overlapping portion 32 do not become hooked with the lip 43 of the inner overlapped portion 33, and therefore, the band body can be fastened smoothly.

Second Embodiment

In this embodiment, the area where the slit 44 is formed is stronger than the surrounding area. That is to say, as shown in FIGS. 1(a) and 1(b), ribs 48 are formed in the area where the slit 44 is formed, so as to increase the strength of that area. The ribs 48 are located on both sides of the slit 44, have lengths approximately identical to the length of the slit 44, and extend parallel to the slit 44. Because the ribs 48 are provided in the area where the slit 44 is formed, the modulus of the area where the slit 44 is formed is large. Therefore, increased strength against breakage is obtained, and thus breakage in the area where the slit 44 is formed is prevented. In addition, the entire band body 31 can be hardened, and thereby the area where the slit 44 is formed can be made even stronger.

Also, in this embodiment, ribs 49 are formed in the area where the second tool claw 38 is formed, parallel to the second tool claw 38. As a result, the area where the ribs 49 are formed also has increased strength. Thus, even when a fastening force is applied using a fastening tool, deformation of the area where the second tool claw 38 is formed is prevented.

Third Embodiment

Figure 5:
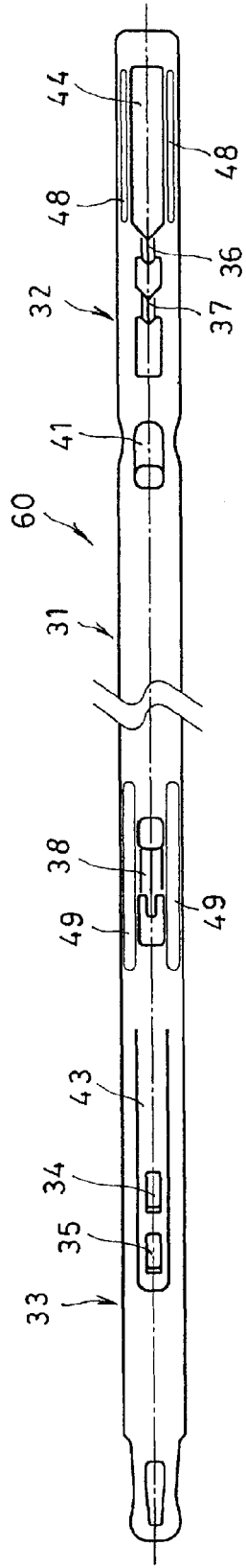
FIGS. 5(*a*) and 5(*b*) are a plane view and a side view, respectively, of the third embodiment of the boot band.
Figure 5:
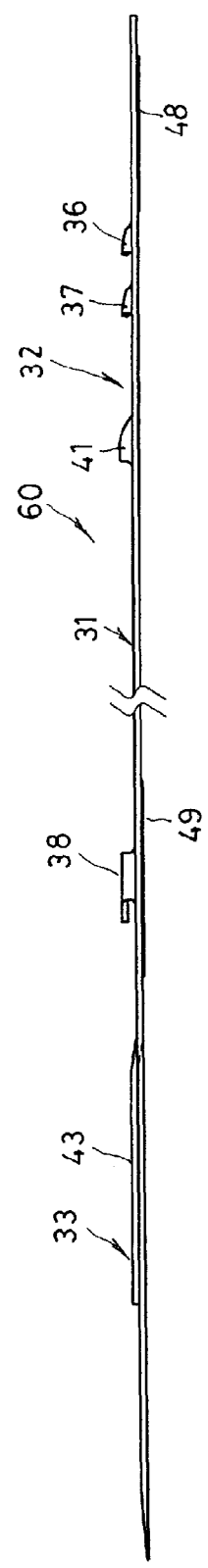
Figure 6:
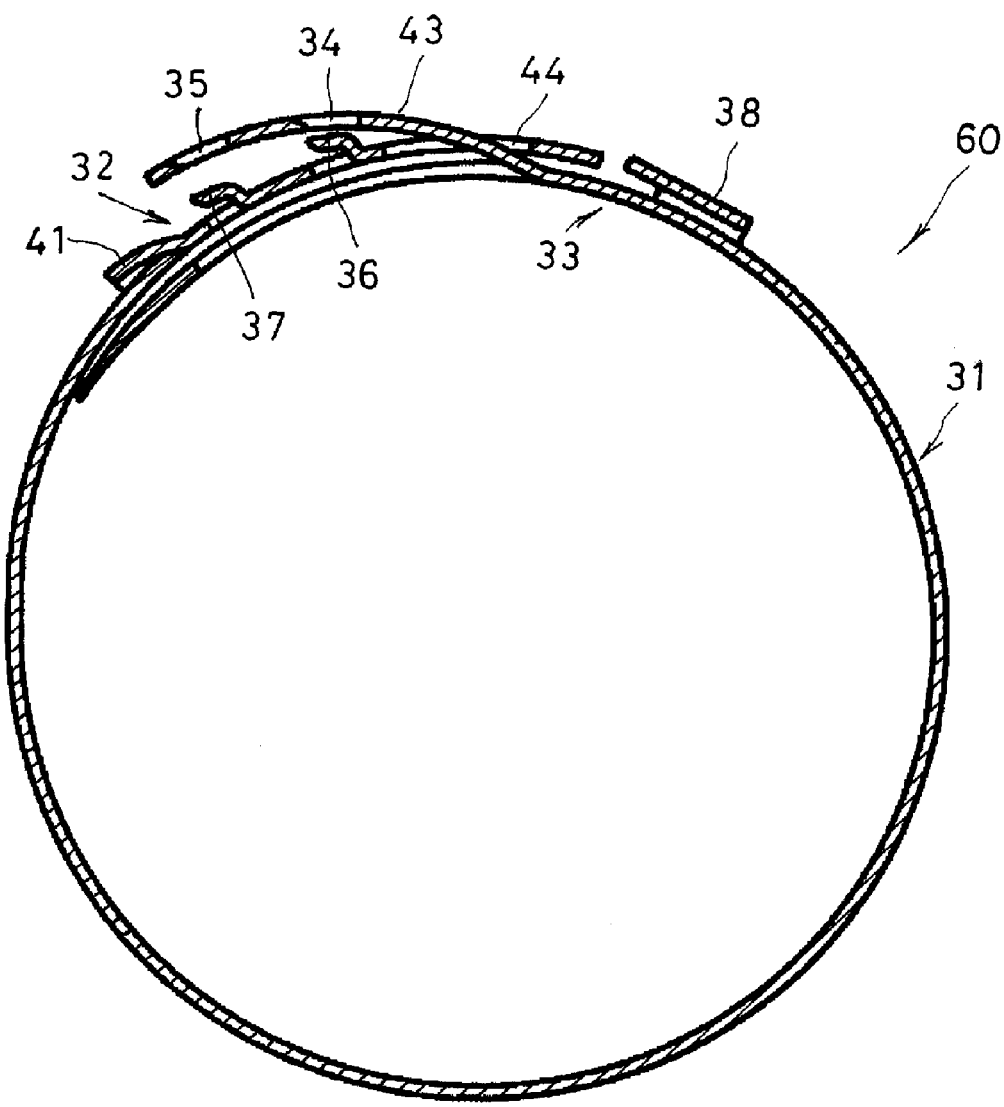
FIG. 6 is a longitudinal cross-sectional view showing the third embodiment of the boot band when being fastened.

FIGS. 5(a) and 5(b) are a plane view and a side view, respectively, of a boot band 60 as a third embodiment, and FIG. 6 is a longitudinal cross-sectional view of the boot band after it has been wound like a ring but before fastening has been completed.

In this embodiment, a first tool claw 41 is formed at an intermediate portion in the longitudinal direction of the outer overlapping portion 32. That is to say, the first tool claw 41 is formed to the rear of the engagement claws 36 and 37 of the outer overlapping portion 32. Also in this a structure, where the first tool claw 41 is provided at this position, the ring condition where the outer overlapping portion 32 is assembled with the inner overlapped portion 33 is maintained by making the lip 43 penetrate through the slit 44. Under this condition, the band body 31 is reduced in the diameter-reducing direction by pressure applied to the first tool claw 41 and the second tool claw 38 by a fastening tool, so that the engagement claws 36 and 37 of the outer overlapping portion 32 can be engaged with the engagement holes 34 and 35, respectively, of the lip 43. In that way the member to be fastened is fastened.

The boot band 60 in this embodiment has a lip 43 and a slit 44, and its structure is similar to that of the boot band 30 shown in FIGS. 1 to 4. However, this embodiment does not include the guide projection 45 or the guide slit 46. But even with a structure that does not include the guide projection 45 and the guide slit 46, the lip 43 penetrates through the slit 44 of the outer overlapping portion 32 and moves into the slit 44, and therefore the outer overlapping portion 32 and the inner overlapped portion 33 do not become displaced in the width direction. Accordingly, the engagement claws 36 and 37 can surely be engaged with the engagement holes 34 and 35, respectively.

Fourth Embodiment

Figure 7:
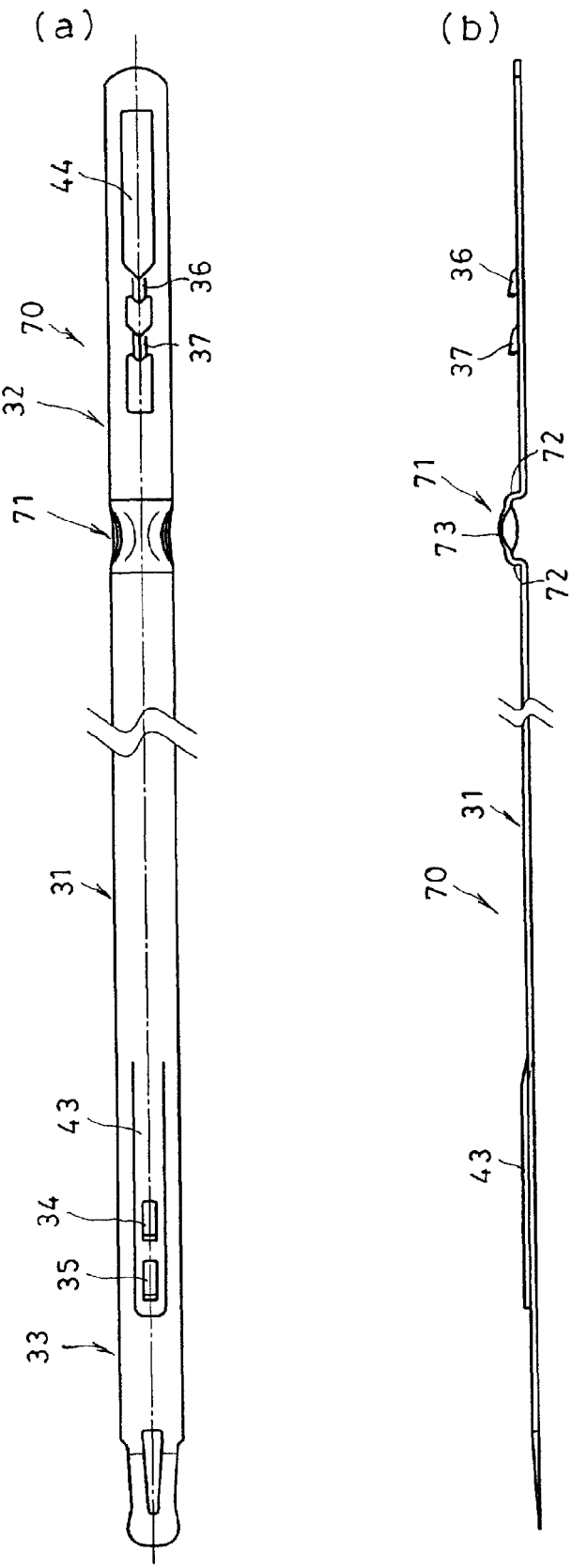
FIGS. 7(a) and 7(b) are a plane view and a side view, respectively, of the fourth embodiment of the boot band.
Figure 8:
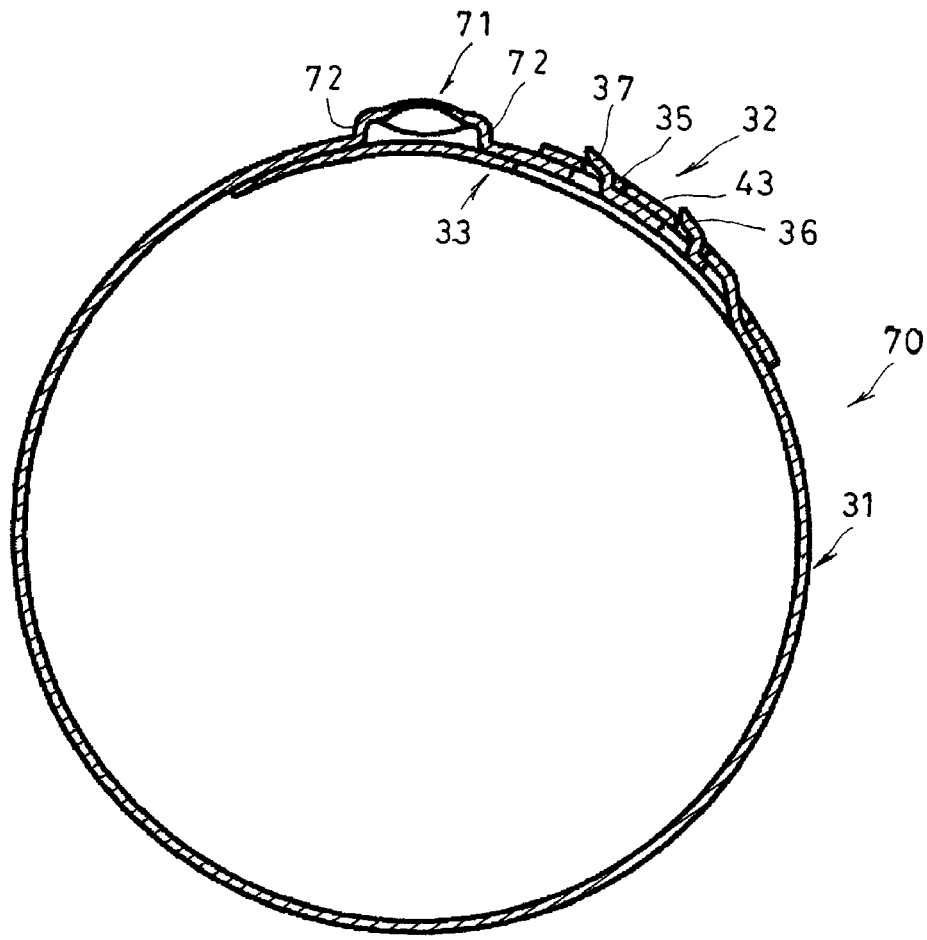
FIG. 8 is a longitudinal cross-sectional view showing the fourth embodiment of the boot band when being fastened.
Figure 9:
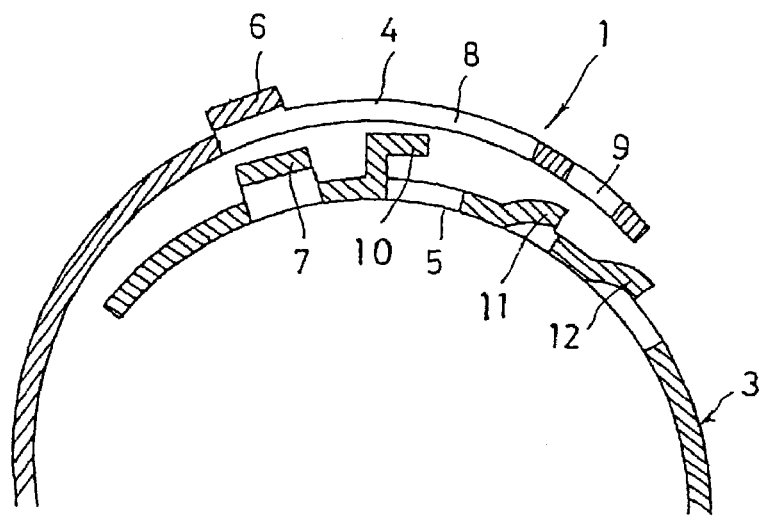
FIG. 9 is a longitudinal cross-sectional view of a first conventional boot band when wound like a ring.
Figure 10:
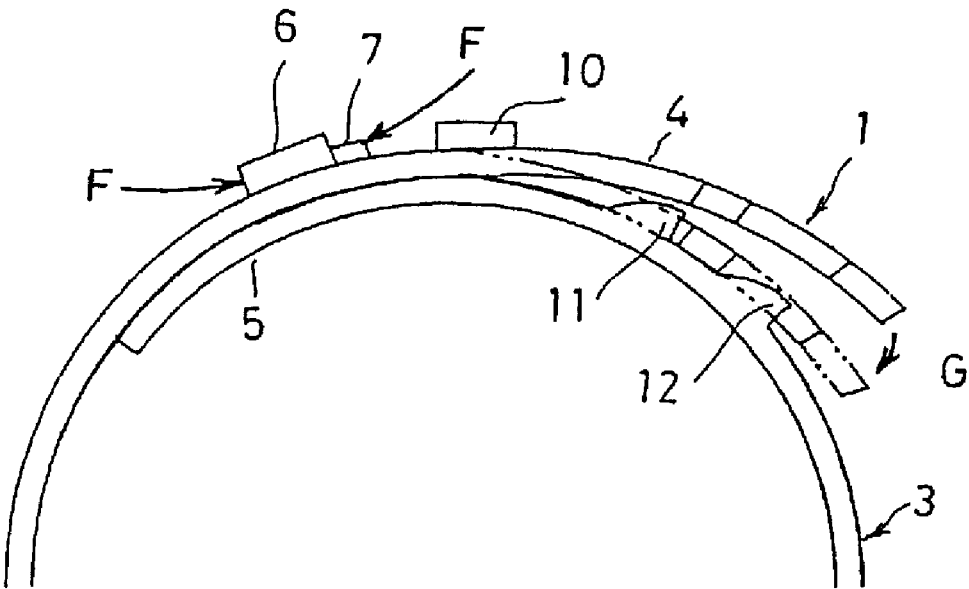
FIG. 10 is a side view showing the action for fastening the first conventional boot band.
Figure 11:
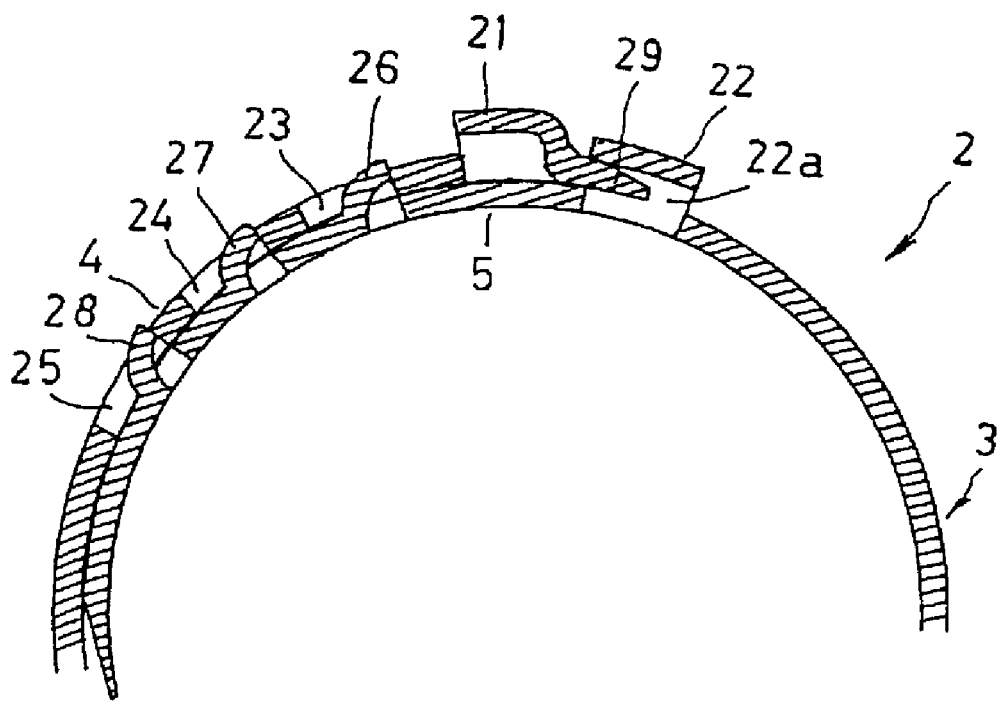
FIG. 11 is a longitudinal cross-sectional view of a second conventional boot band when fastened.

FIGS. 7(a) and 7(b) are a plane view and a side view, respectively, of a boot band 70 in a fourth embodiment, and FIG. 8 is a longitudinal cross-sectional view of the boot band 70 after it has been wound like a ring but before fastening has been completed.

In this embodiment, the lip 43 is formed on the inner overlapped portion 33 of the band body 31 in such a way that the lip 43 is isolated from its surrounding area. The slit 44, through which the lip 43 penetrates, is formed on the outer overlapping portion 32. Also, an ear portion 71 for fastening the band body 31 in the diameter-reducing direction is formed on the outer overlapping portion 32 of the band body 31. As shown in FIG. 7(b), the ear portion 71 is formed of two legs 72 that rise from the band body 31 and a bridging portion 73 that connects the two legs 72.

While the lip 43 penetrates the slit 44, the boot band 70 is wound like a ring around the member to be fastened. Under this wound condition, the band body 31 is fastened in the diameter-reducing direction. By this fastening, the engagement holes 34 and 35 of the lip 43 are engaged with the engagement claws 36 and 37, respectively, of the outer overlapping portion 32, so that the member to be fastened is fastened. The band body is fastened in the diameter-reducing direction by applying a force to the pair of the legs 72 of the ear portion 71 in such a way that the pair of the legs 72 approach each other, so as to deform the entire ear portion 71. Also in this case, the engagement holes 34 and 35 are automatically engaged with the engagement claws 36 and 37, respectively, due to the fastening in the diameter-reducing direction, and therefore the boot band can easily be fastened.

What is claimed is:
1. A boot band comprising:
a band body that is fastenable, by being wound in a ring shape around a member to be fastened, said band body having an outer overlapping portion and an inner overlapped portion that form the ring shape by being overlapped on each other in a fastening direction of the band body;
engagement claws on said outer overlapping portion of the band body;
engagement holes in said inner overlapped portion of the band body and engageable with said engagement claws so as to maintain the band body in a fastened condition;
a lip formed by separating in a width direction of the band body said inner overlapped portion's area in which an engagement hole is formed, from both sides of the band body's area surrounding said inner overlapped portion's area, and having a free end in said fastening direction; and
a slit adjacent to said engagement claws in said outer overlapping portion,
wherein the lip is penetrable through the slit.
2. The boot band according to claim 1, wherein an elastic force is applied to said lip in a direction for engaging said engagement holes with said engagement claws.

3. The boot band according to claim 1, further comprising
a guide slit that extends in the fastening direction and is formed in either the outer overlapping portion or the inner overlapped portion, and
a guide projection that is slidably penetrable with the guide slit and is formed in the inner overlapped portion when the guide slit is formed in the outer overlapping portion or in the outer overlapping portion when the guide slit is formed in the inner overlapped portion.

4. The boot band according to claim 1, further comprising a first area where a slit is formed has a stronger structure than a second area surrounding the first area where the slit is formed.

5. The boot band according to claim 4, further comprising ribs that are formed in the second area so as to increase the strength of the second area.

\* \* \* \* \*